Dec. 20, 1932.  L. L. FOSS  1,891,306
WORM WATER MOTOR
Filed Dec. 29, 1930

Inventor
Leland L. Foss
by Lester Sargent
Atty.

Patented Dec. 20, 1932

1,891,306

UNITED STATES PATENT OFFICE

LELAND L. FOSS, OF STATESBORO, GEORGIA, ASSIGNOR, BY DIRECT AND MESNE ASSIGNMENTS, OF PART INTERESTS TO EDWARD T. SKEFFINGTON, BERT H. DE LOACH, AND ARTHUR H. BARRINGTON, ALL OF SAVANNAH, GEORGIA; SAM J. FOSS, OF STATESBORO, GEORGIA; AND LEE V. GRAHAM, OF CHATHAM COUNTY, GEORGIA

WORM WATER MOTOR

Application filed December 29, 1930. Serial No. 505,401.

The object of my invention is to provide a novel rotary type motor for operation by a flowing current of water and which is so constructed and arranged as to be capable of great efficiency and adapted to operate at high speed.

It is also an especial object of my invention to provide a novel reduced passage for the inflow of the water to the motor and to provide a motor having a spiral breadth of a pitch best adapted to produce the greatest power.

I attain these and other objects of my invention by the mechanism illustrated in the accompanying drawing, in which,—

Figure 1:
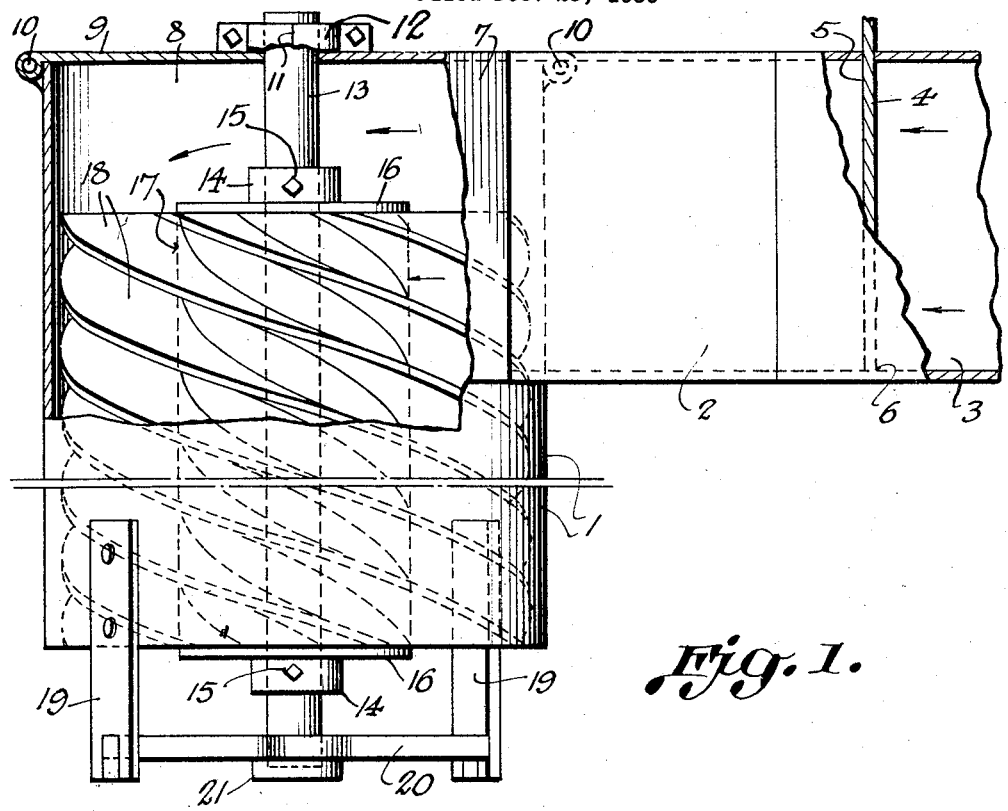
Figure 2:
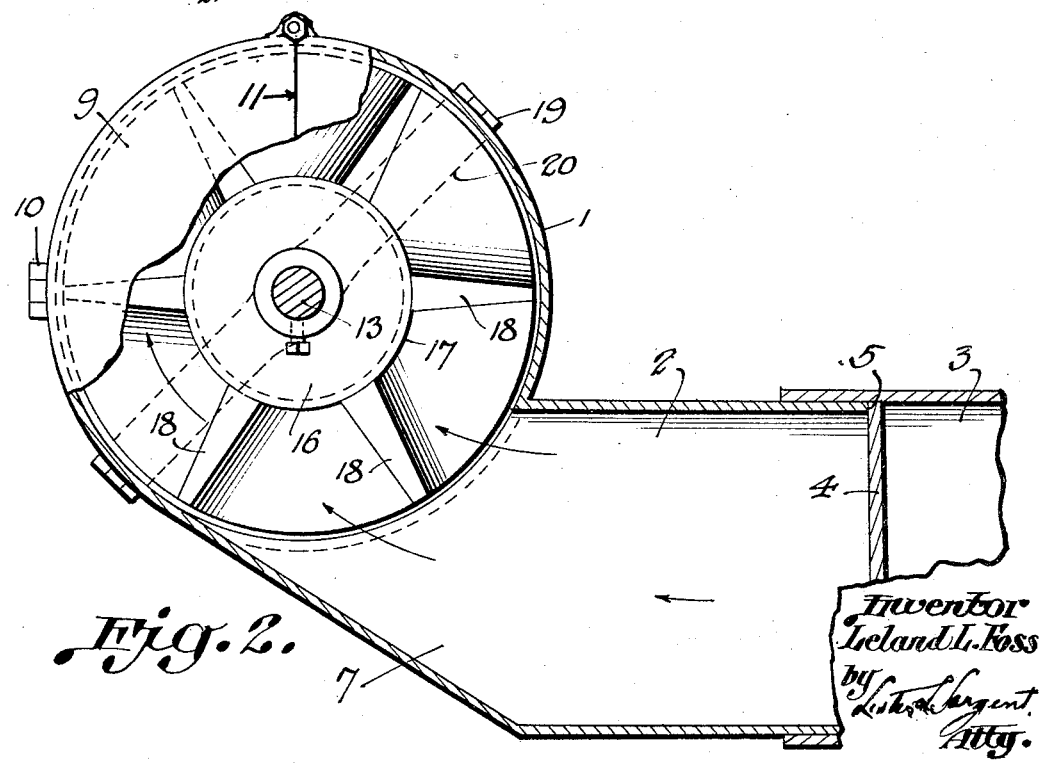

Figure 1 is a view of my invention partly in section and partly in side elevation; and Fig. 2 is a view of my invention partly in section and partly in end elevation.

Like numerals designate like parts in each of the views.

Referring to the accompanying drawing, I provide a cylindrical motor casing 1 into the upper portion of which a water or current passage 2 opens, said passage having a reduced end passage portion 7 whereby to increase the force of the flow of water into the motor, as it enters the chamber 8 in the end of the motor casing. The passage 2 connects with the passage 3 which is provided with a gate 4 which abuts against the end portion 5 of the wall of the passage 2, as shown in Figs. 1 and 2. The motor casing 1 is provided with a divided lid 9 which is hingedly connected by suitable hinges 10 with opposite portions of the wall of the motor.

I provide the bearing at 12 which also is divided at 11 and engages the shaft 13 being releasably secured to said shaft by bolts which extend through opposite ears formed on the bearing. The hub cylinder 17 is a hollow cylinder to which are affixed (preferably cast) a series of spiral blades 18, which blades are disposed at a pitch of approximately 25° or within a range of from 20° to 80°. Mounted on the shaft 13 is a hub cylinder 17 which on its ends 16 carries the hubs 14 in which are mounted the set screws or keys 15 by means of which the hubs and hub cylinder are affixed to the shaft 13. Members 14 and 17 are integral. This pitch of the blades have been found by experiment to be much more efficient than a different pitch for this particular motor. I provide supports 19 affixed to the outer wall of the motor casing 1, as shown, the supports in turn carrying a transverse bar 20 which carries the supporting or lower bearing 21 which supports the lower end of shaft 13. It is within the contemplation of my invention to utilize ball or roller bearings on the machine if desired.

In operation the water flows in through the passage 3 as indicated by arrows in Fig. 1 and through the passage 2 and the reduced passageway 7, one side of said passageway being alined with the periphery of the cylinders 17 as shown in Fig. 1, whereby the entire force of the current is applied to the spiral blades 18, the pitch of which is such as to make the most efficient use of the current power and to drive the motor at high speed. It is of course to be understood that the shaft 13 will be suitably extended and that any desired machinery may be operatively connected with and driven by that shaft.

While I prefer to arrange the motor in a vertical position relative to the flowing current, it may, if desired, be disposed horizontal and parallel to the current flow.

The passages 3 and 2, as shown in the drawing, are square in cross section and an elbow is formed at the junction of the reduced portion 7 of the passage with the main passage 2, the wall of the reduced end being disposed to align with the wall of the cylinder casing at its juncture with same, whereby the speed and force of the flow of water where it enters the cylinder is increased and the area of capacity of this inflow passage or conduit is substantially in excess of the capacity of the passages between the blades 18, of which there are preferably six in number so that great pressure is constantly exerted on the blades and a rapid operation of the motor produced.

For the purposes of this specfication the term "square" as applied to the water passages 2 and 3 shall be construed to cover also a rectangular water passage.

What I claim is:—

1. In a water motor, the combination of a cylindrical casing, a shaft rotatably mounted in the casing, a hub cylinder mounted on the shaft and a series of spaced spiral blades mounted on the hub cylinder, a chamber above the cylinder and blades, and a water passage opening into said chamber, said water passage being of reduced size where it opens into the chamber, whereby to increase the force of the flow of water, the cylindrical motor casing having divided lids hingedly mounted thereon and a divided bearing positioned above said lids and in which the motor shaft is mounted.

2. In a water motor, the combination of a cylindrical casing, a shaft rotatably mounted in the casing, a hub cylinder mounted on the shaft and a series of spaced spiral blades mounted on the hub cylinder, a chamber above the cylinder and blades, and a water passage opening into said chamber, said water passage being of reduced size where it opens into the chamber, whereby to increase the force of the flow of water, the cylindrical motor casing having divided lids hingedly mounted thereon and a divided bearing positioned above said lids and in which the motor shaft is mounted, and a lower bearing in which the lower end of the shaft is mounted and supporting means carrying said bearing and fastened to the outer wall of the cylinder casing, substantially as shown.

3. In a water motor, the combination of a cylindrical casing, a shaft rotatably mounted in the casing, a hub cylinder mounted on the shaft, a series of closely spaced spiral blades having a pitch range from approximately 20 to 30 degrees mounted on the cylinder, a chamber above the cylinder and blades, a water passage opening into said chamber, the cylindrical motor casing having divided lids mounted thereon to permit convenient access to the interior of the casing, and a removable bearing positioned above said lids and in which the motor shaft is mounted.

LELAND L. FOSS.